(12) United States Patent
Armoni et al.

(10) Patent No.: US 10,686,519 B2
(45) Date of Patent: Jun. 16, 2020

(54) DEVICE FOR DIRECT SIMPLEX COMMUNICATION BETWEEN MOBILE DEVICES USING CARRIER FREQUENCIES OF A CELLULAR MOBILE PHONE SYSTEM

(71) Applicants: DMONETWORKS AG, Baar (CH); Hanan Armoni, D.N. Modiin (IL); Saar Shlapobersky, Ramot-Hashavim (IL)

(72) Inventors: Hanan Armoni, D.N. Modiin (IL); Saar Shlapobersky, Ramot-Hashavim (IL)

(73) Assignee: DMONETWORKS AG, Baar (CH)

( * ) Notice: Subject to any disclaimer, the term of this patent is extended or adjusted under 35 U.S.C. 154(b) by 0 days.

(21) Appl. No.: 15/560,410

(22) PCT Filed: Jul. 1, 2015

(86) PCT No.: PCT/EP2015/064970
§ 371 (c)(1),
(2) Date: Sep. 21, 2017

(87) PCT Pub. No.: WO2017/001007
PCT Pub. Date: Jan. 5, 2017

(65) Prior Publication Data
US 2018/0069623 A1    Mar. 8, 2018

(51) Int. Cl.
*H04B 7/26* (2006.01)
*G06F 21/43* (2013.01)
(Continued)

(52) U.S. Cl.
CPC ........... *H04B 7/2643* (2013.01); *G06F 21/43* (2013.01); *H04M 1/72519* (2013.01);
(Continued)

(58) Field of Classification Search
CPC .. G06F 21/43; H04M 1/72519; H04B 7/2643; H04S 1/007
See application file for complete search history.

(56) References Cited

U.S. PATENT DOCUMENTS

| 5,995,500 | A | 11/1999 | Ma et al. | |
| 2006/0129848 | A1* | 6/2006 | Paksoy | G06F 21/78 713/193 |

(Continued)

FOREIGN PATENT DOCUMENTS

| EP | 1 988 724 A1 | 11/2008 | |
| EP | 1988724 A4 * | 11/2012 | ............ H04W 76/14 |
| WO | 2015/104592 A1 | 7/2015 | |

OTHER PUBLICATIONS

Krister Raith; Capacity of Digital Cellular TDMA Systems; 1991; IEEE; All (Year: 1991).*

(Continued)

*Primary Examiner* — Ricky Q Ngo
*Assistant Examiner* — Stephen N Steiner
(74) *Attorney, Agent, or Firm* — Seed Intellectual Property Law Group LLP

(57) ABSTRACT

The invention relates to a device for direct communication in simplex mode between mobile devices, in particular mobile phones, using carrier frequencies of a cellular mobile phone system, wherein each carrier frequency transmits a TDMA frame with a TDMA frame duration of 4.615 ms and each TDMA frame comprises 8 time slots with a duration of 577 microseconds, wherein the device comprises a hardware module which controls direct communication, wherein the device is designed to combine TDMA frames into a multi-frame which comprises 13 TDMA frames with the positions 0 to 12 and is configured in such a manner that in simplex mode the mobile devices involved constantly transmit and receive in time slots which are separate from one another (Continued)

and within each multi-frame in each TDMA frame only the first time slot TS0 is assigned to transmitting or receiving, while the other time slots TS1 to TS7 of the TDMA frame are left free.

13 Claims, 10 Drawing Sheets

(51) Int. Cl.
*H04M 1/725* (2006.01)
*H04S 1/00* (2006.01)
*H04W 76/14* (2018.01)
*H04W 4/10* (2009.01)
*H04W 92/18* (2009.01)

(52) U.S. Cl.
CPC ............... *H04S 1/007* (2013.01); *H04W 4/10* (2013.01); *H04W 76/14* (2018.02); *H04W 92/18* (2013.01)

(56) References Cited

U.S. PATENT DOCUMENTS

2008/0304469 A1* 12/2008 Dorion .................. H04W 88/02
370/347
2012/0231835 A1* 9/2012 Zhang .................. H04W 88/06
455/552.1

OTHER PUBLICATIONS

Raith et al., "Capacity of Digital Cellular TDMA Systems," *IEEE Transactions on Vehicular Technology* 40(2):323-332, May 1, 1991.
International Search Report, dated Feb. 25, 2016, for PCT/EP2015/064970, 7 pages (including English translation).

* cited by examiner

Fig. 2

TCH data burst

| 3 bits Tail | Encrypted bits 57 bits | Training Sequence 26 bits | Encrypted bits 57 bits | 3 bits Tail | 8,25 bits Guard period |

SCH synchronization burst

| 3 bits Tail | Encrypted bits 39 bits | Extended Training Sequence 64 bits | Encrypted bits 39 bits | 3 bits Tail | 8,25 bits Guard period |

FCCH frequency correction burst

| 3 bits Tail | 142 bits All bits coded "0" | 3 bits Tail | 8,25 bits Guard period |

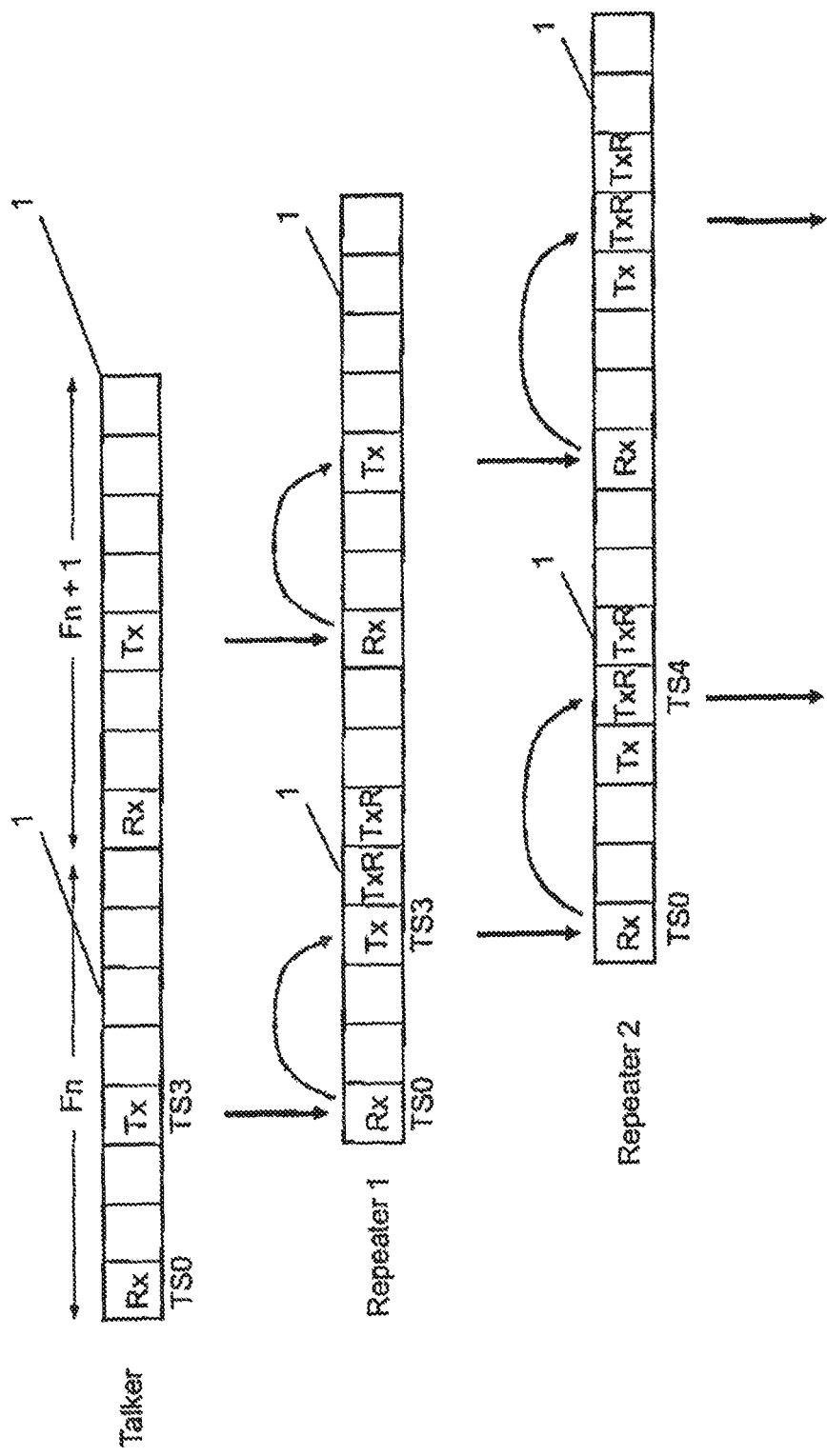

DEVICE FOR DIRECT SIMPLEX COMMUNICATION BETWEEN MOBILE DEVICES USING CARRIER FREQUENCIES OF A CELLULAR MOBILE PHONE SYSTEM

BACKGROUND

Technical Field

The disclosure relates to a device for direct communication by mobile devices and also a mobile phone having such a device.

Description of the Related Art

With cellular mobile phone networks, particularly the worldwide GSM standard, for mobile speech and data transmission between mobile devices, digital data are transmitted using a mixture of frequency multiplexing and time multiplexing (Time Division Multiple Access—TDMA), wherein transmission and reception bands are provided in different frequency bands. The GSM frequency band is divided into multiple channels at an interval of 200 kHz. In the case of GSM 900, 124 channels are provided in the 890-915 MHz range for the uplink to the base station and in the 935-960 MHz range 124 channels are provided for the downlink. The TDMA frame duration is approximately 4.615 ms and corresponds to the duration of exactly 1250 symbols. Each of the eight time slots per frame therefore lasts approximately 0.577 ms, corresponding to the duration of 156.25 symbols. Bursts of different types can be transmitted and received in these time slots. The duration of a normal burst is approximately 0.546 ms, in which 148 symbols are transmitted.

Following transmission of a reception burst, the mobile phone switches in the GSM standard to the transmission frequency offset by 45 MHz, where it transmits the burst of the return channel to the base station. Since the downlink and uplink are offset by three time slots, one antenna is sufficient for the downlink and uplink transmission.

A cellular mobile phone system, in particular a GSM-based communication system, always requires an effective network, however, which is supplied by one or a plurality of base stations. Communication of mobile devices with one another without an effective GSM network is not provided with traditional GSM-based mobile devices, although it would be desirable, in order to facilitate rudimentary communication between mobile devices in a disaster scenario. This kind of rudimentary communication may particularly involve communication in simplex mode, in other words communication in which only one mobile device transmits. In the following, this rudimentary simplex communication is referred to as direct communication or direct mode, in contrast to the traditional GSM connection which always works in duplex mode.

Devices for direct communication by mobile devices in simplex mode without a GSM base station have been known in the art for some time; however communication takes place over proprietary frequency bands, meaning that the use of proprietary transmitters and receivers is required. The devices cannot therefore be used with traditional GSM mobile phones.

The problem addressed by the disclosure is therefore that of improving the known devices for direct communication in simplex mode and creating a device which allows an existing GSM-based mobile phone to be easily adapted for direct communication mode, without using additional frequency bands.

It should be made possible, in particular, to use GSM-based mobile phones to set up a GSM connection via a GSM base station, a direct communication with other adapted mobile phones without a GSM base station, and also a simultaneous combination of these connection types.

Simultaneous connections in this context are regarded as two or more speech or data connections which take place substantially simultaneously for the human user.

Direct-mode operation should also facilitate communication when the network fails, e.g., in disaster scenarios or when there is no network available for other reasons, for example in rural areas or in the case of commercial use, for example by railway workers far away from GSM networks. An exemplary application may be large construction sites, for example, where a large number of staff communicate with one another, which can generate substantial costs in traditional GSM operation. Since direct mode is not network-dependent, direct communication should not generate any network-dependent costs.

BRIEF SUMMARY

These and other problems are solved according to the disclosure by a device having the features of claim 1.

The device according to the disclosure uses the available carrier frequencies of a cellular mobile phone system, wherein each carrier frequency transmits a TDMA frame with a TDMA frame duration of 4.615 ms and each TDMA frame comprises 8 time slots with a duration of 577 microseconds. The device is designed to combine these TDMA frames into a multi-frame which comprises 13 TDMA frames with the positions 0 to 12. The device is configured in such a manner that in simplex mode the mobile devices involved constantly transmit and receive in time slots which are separate from one another, wherein within each multi-frame in each TDMA frame only the first time slot TS0 is assigned to transmitting or receiving, while the other time slots TS1 to TS7 of the TDMA frame are left free. The time slots which are left free TS1 to TS7 may be used for this connection, insofar as a cellular mobile phone connection is available.

The cellular mobile phone connection according to the disclosure may, in particular but not exclusively, be GSM, 3G/UMTS, CDMA, 4G/LTE or other mobile phone connections with carrier frequencies in the range of 400 MHz to 2 GHz.

According to the disclosure, the device is configured as a separate hardware module which controls direct communication.

This has the advantage that the traditional GSM transmission is not affected. The mobile devices can still transmit and receive in the GSM system, namely in the unused time slots of the multi-frame. Only individual time slots of the GSM transmission frame are used for simplex communication with other mobile devices. The participating mobile devices use the GSM transmission frame and create their own synchronized multi-frame with their own synchronization and frequency adjustment, within which they can communicate with one another using the simplex method. This means that no new frequency bands need to be allocated and the existing hardware of the GSM mobile devices can be used for the most part.

According to the disclosure, the device can be set up both for performing cellular mobile communication and direct communication simultaneously, and also for carrying out cellular mobile communication or direct communication separately.

According to the disclosure, the hardware module can be configured for integration into one of the mobile devices, in particular for integration into a mobile phone. The mobile phone may be configured as a smartphone which is set up for executing a software application (app) to actuate and control the hardware module.

In particular, the hardware module may comprise a microphone and a microphone interface for connecting to a mobile device, a speaker and a speaker interface for connecting to the mobile device, and also a converter circuit for the mixing and/or level adjustment of the audio signals.

According to the disclosure, the hardware module may be a multiplexer for mixing the audio signals of a direct communication connection with the audio signals of a GSM connection. In particular, the device may comprise a separate component that can be connected to one of the mobile devices, preferably via a USB interface, with a separate speaker and a separate microphone and preferably a separate energy supply, wherein the hardware module may be integrated into the component. Rather than the USB interface, every other digital high-speed interface can be provided according to the disclosure.

According to the disclosure, the separate component may be configured as an external speaker microphone which may be connectible via a USB interface to a mobile device, preferably a mobile phone. According to the disclosure, a USB-UART converter may be provided to drive the hardware module.

According to the disclosure, the separate component may comprise a multiplexer controlled by a USB Codec and a control logic for mixing the audio signals in direct communication with the audio signals of a GSM connection. The hardware module may comprise a serial interface, preferably configured as a UART interface, and an antenna connection.

According to the disclosure, the component may comprise operating elements, preferably a push-to-talk button and an emergency call button, which may be connected to the hardware module.

According to the disclosure, it may be provided that the hardware module is configured in such a manner that at position 11 in the multi-frame in time slot TS0 an FCCH frequency correction burst is transmitted and at position 12 of the multi-frame in time slot TS0 an SCH synchronization burst is transmitted and in the remaining positions of the multi-frame in time slot TS0 TCH data bursts are transmitted.

According to the disclosure, it may be provided that 158.25 bits are transmitted in each time slot, wherein a TCH data burst comprises a training sequence of 26 bits and two data packets of 57, an SCH synchronization burst, a training sequence of 64 bits and two data packets of 39 bits each and the FCCH frequency correction burst comprises 142 bits with the symbol "0".

According to the disclosure, the hardware module may be configured in such a manner that the mobile device assumes a repeater function, wherein it can forward a data packet received in a first time slot, preferably in position TS0, of an agreed TDMA frame in a second time slot, preferably at position TS3, of the same TDMA frame.

According to the disclosure, the hardware module can forward the received data packet in different time slots within the agreed TDMA frame, preferably at position TS3, TS4 and TS5, depending on whether the mobile device is the first, second or third repeater. In this way, a collision of the data packets in overlapping regions between the originally transmitted signal and the signal transmitted by the repeater is prevented.

The disclosure further extends to a mobile device, in particular a mobile phone, comprising an integrated device according to the disclosure, or connected to an external device according to the disclosure.

Further features according to the disclosure result from the patent claims, the figure description and the figures.

BRIEF DESCRIPTION OF THE SEVERAL VIEWS OF THE DRAWINGS

FIG. 2 shows the structure of a TCH data burst, an SCH synchronization burst and an FCCH frequency correction burst.

FIG. 4 shows the transmission protocol in the repeater function. Each frame works not only in time slot 1, but the other time slots are used too.

DETAILED DESCRIPTION

The disclosure is explained in greater detail below with the help of non-exclusive exemplary embodiments.

Figure 1A:
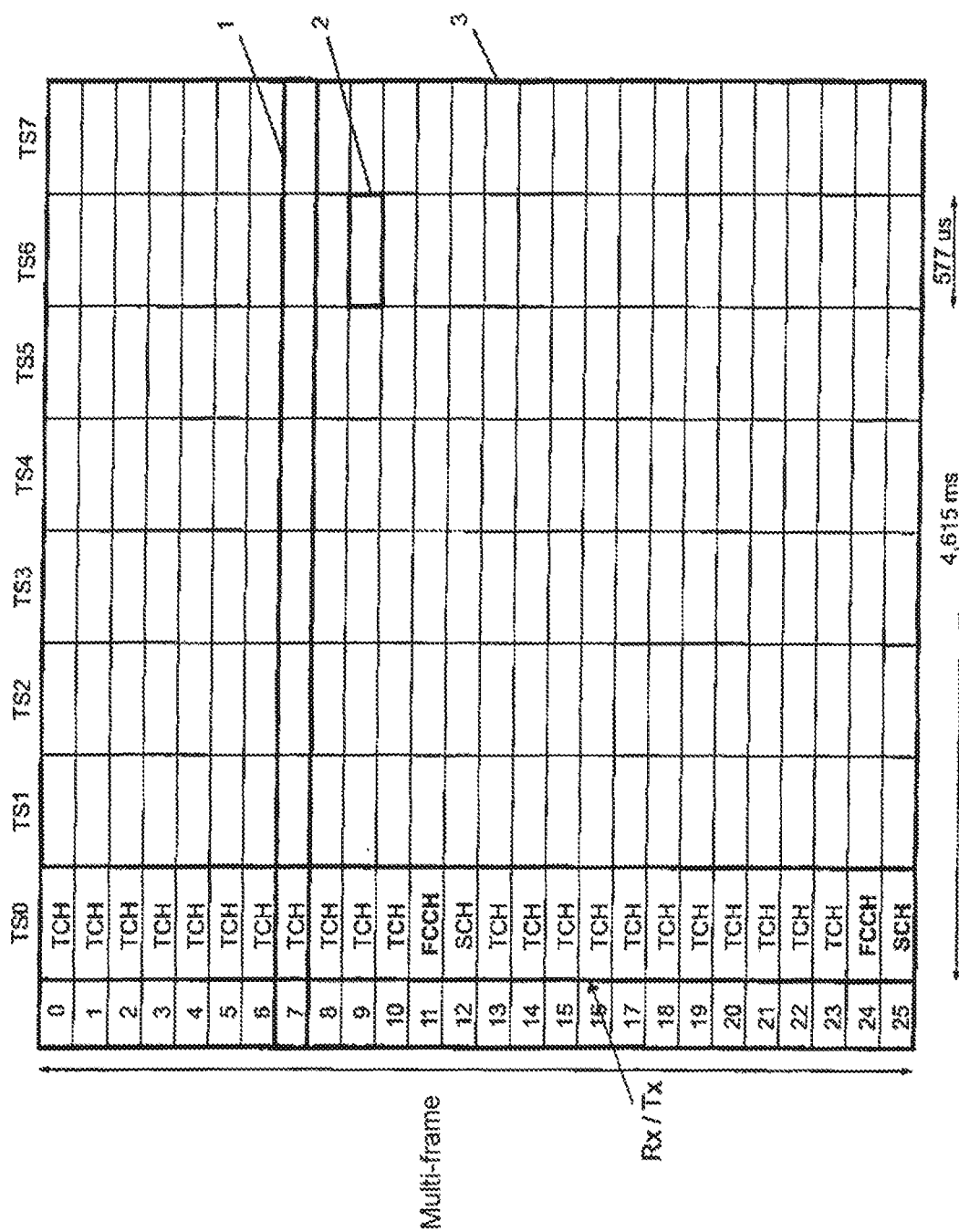
FIG. 1A shows an exemplary embodiment of a multi-frame 3 defined by a device according to the disclosure which comprises 26 individual TDMA frames 1.

FIG. 1A shows an exemplary embodiment of a multi-frame 3 defined by a device according to the disclosure which comprises 26 individual TDMA frames 1. Each TDMA frame 1 comprises eight time slots 2 with the designation TS0 to TS7. When using direct communication, bursts with the designation TCH, FCCH and SCH are transmitted in the time slots. The abbreviation TCH denotes the Traffic Channel Burst which contains the speech data to be transmitted. FCCH means Frequency Correction Channel and SCH is the Synchronization Channel. The frames 11 and 24 within the multi-frame are used for the transmission of FCCH frequency correction bursts and the frames 12 and 25 are used for the transmission of SCH synchronization bursts.

Both in direct communication transmission mode and also in direct communication reception mode, only the first time slot TS0 is assigned to transmission or reception within the multi-frame in each TDMA frame, while the other time slots TS1 to TS7 are either left free or used for the regular GSM connection.

The device according to the disclosure ensures that direct communication takes place in simplex mode, so that a mobile device can always only either transmit or receive in direct mode, notwithstanding a possible parallel GSM connection.

Figure 1B:
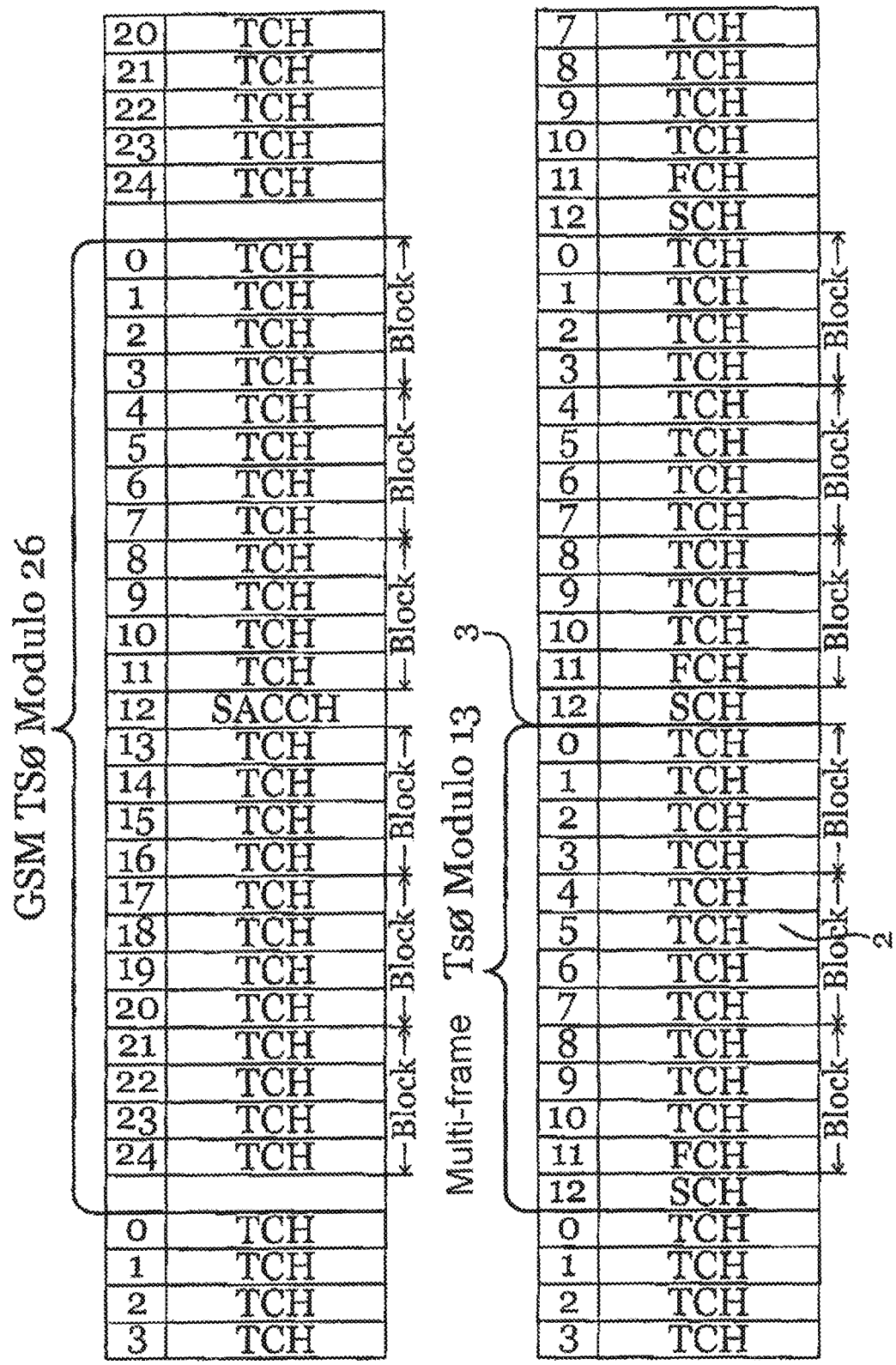
FIG. 1B shows a comparison between the regular GSM frame structure in the TDMA protocol (top) and the frame structure according to the disclosure (bottom), wherein only time slot TS0 is shown.

FIG. 1B shows a comparison between the regular GSM frame structure in the TDMA protocol (top) and the frame structure according to the disclosure (bottom), wherein only time slot TS0 is shown. In the frame structure according to the disclosure, positions 11 and 12 are used within the existing GSM frame for the transmission of SCH and FCH bursts; when making a direct communication connection, these are, however, independent of the synchronization and frequency correction bursts transmitted by any GSM base station.

The direct communication according to the disclosure, unlike the GSM connection, is configured as a "1:N" communication and always takes place exclusively in the time slot TS0 in the TDMA frame.

The other time slots TS1 to TS7 in the TDMA frame are left free, so that the recipients have sufficient time to process the transmitted data. A dynamic adjustment of the time slots used by the base station or a mobile device chosen as the "master" is not provided for, since the method is to be used even when there is no contact to the base station.

There is no dedicated master/slave assignment of the mobile devices by the device according to the disclosure. There is always just one completely arbitrary mobile device that transmits, whereas all other mobile devices within the reception range receive (1:N communication). Following the end of the transmission, any arbitrary mobile device can once again transmit. This means that there is no identification of the transmitting or receiving mobile devices in direct mode. The transmitted message is always addressed to all mobile devices within the reception range, something that is particularly advantageous in a disaster scenario.

FIG. 2 shows the structure of a TCH data burst, an SCH synchronization burst and an FCCH frequency correction burst. In a TCH data burst, 114 data bits are transmitted, in an SCH synchronization burst 78 data bits are transmitted and in a frequency correction burst, no data bits are transmitted.

When mobile devices are operated in direct mode, the range is limited by the relatively low transmission power and by topological influences. The present disclosure therefore also envisages the possibility that the mobile devices according to the disclosure will adopt a repeater function and convey the data transmission between two or more different mobile devices in the manner of a relay station.

Figure 3:
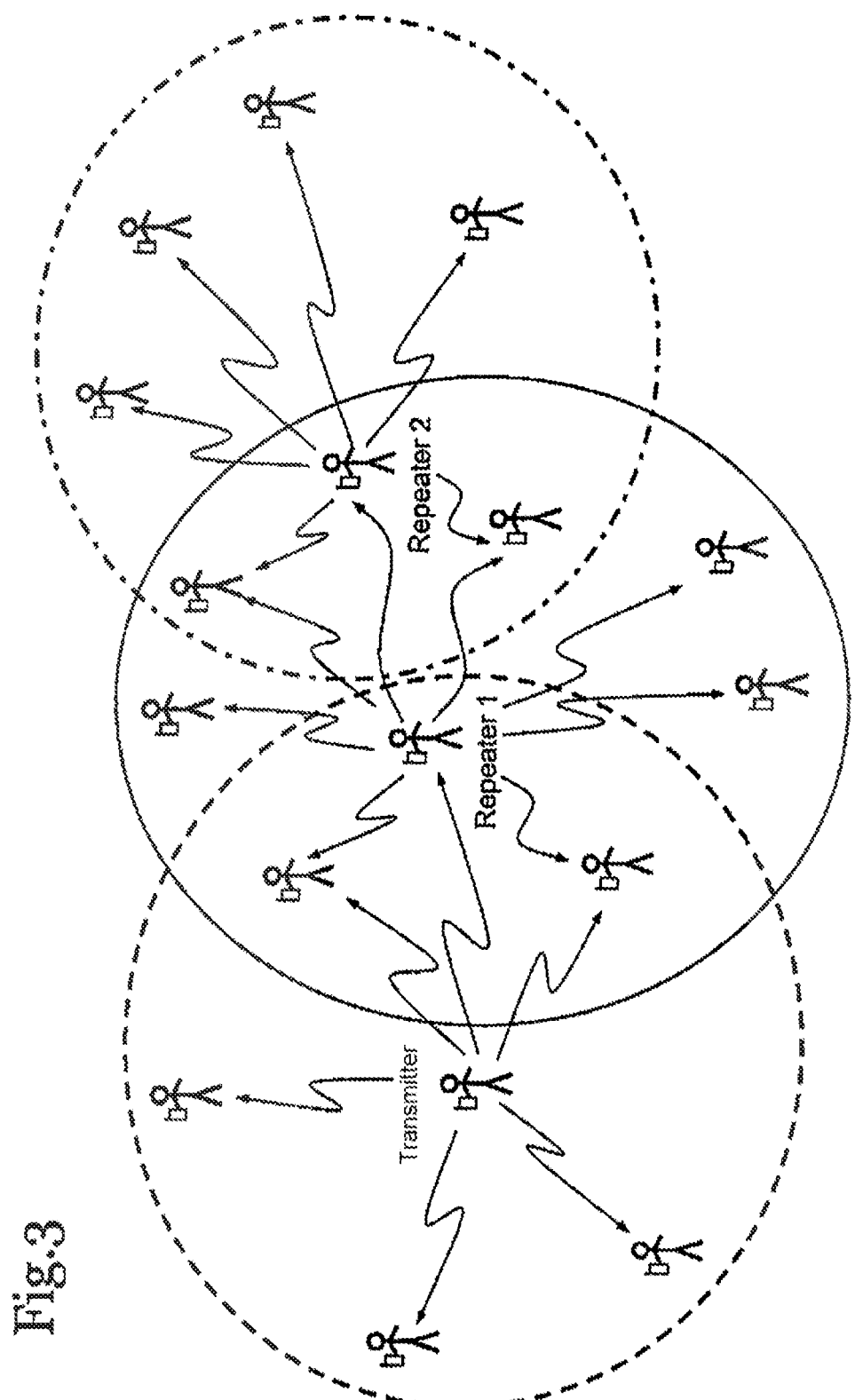
FIG. 3 shows the underlying situation in relation to the repeater function arrangement.

FIG. 3 shows the underlying situation in relation to the repeater function arrangement. A transmitter sends data to a first repeater in direct communication. Said repeater is still located within the range of the transmitter, it receives the data and transmits it on within its range. A second repeater which is located within the range of the first repeater receives the data and forwards it within its transmitting range. In this way, direct communication between mobile devices which are not located in the same transmission range is made possible.

FIG. 4 shows the transmission protocol in the repeater function. Each frame works not only in time slot 1, but the other time slots are used too. The first time slot TS0 is used to receive the transmitted burst. The signal is forwarded via the time slot TS3 from the talker and from the first repeater. The second repeater receives the signal in time slot 1, which is designated Rx, and transmits it across time slot TS4.

A further repeater would likewise receive the data in time slot TS0, but forward it in time slot TS5. Transmission in simplex mode also takes place in the repeater function, which means that each mobile device can only either transmit or receive. Regardless of the repeater function, the mobile devices can in turn operate regular GSM communication in the remaining time slots.

With the hardware implementation of the device according to the disclosure, there are two possibilities in principle, wherein in both cases the device according to the disclosure uses the transmitting and receiving part existing in the mobile phone as the radio interface.

The device may, on the one hand, be integrated in an existing mobile phone, wherein the microphone and speaker or headset connection of the mobile phone are also used for direct communication. In this case, it may be provided that any existing GSM connections are transmitted simultaneously in direct communication, so that the audio signals of both connections are emitted at the speaker and the audio signals received via the microphone are forwarded to both connections.

On the other hand, the device may be configured as an external component, in particular as a remote speaker microphone. In this case, the component has its own speaker and its own microphone. Even in this case, however, it may be provided that any existing GSM connections are simultaneously transmitted using direct communication, so that the audio signals of both connections are emitted at the speaker of the component and the audio signals received via the microphone of the component are forwarded to both connections.

Figure 5A:
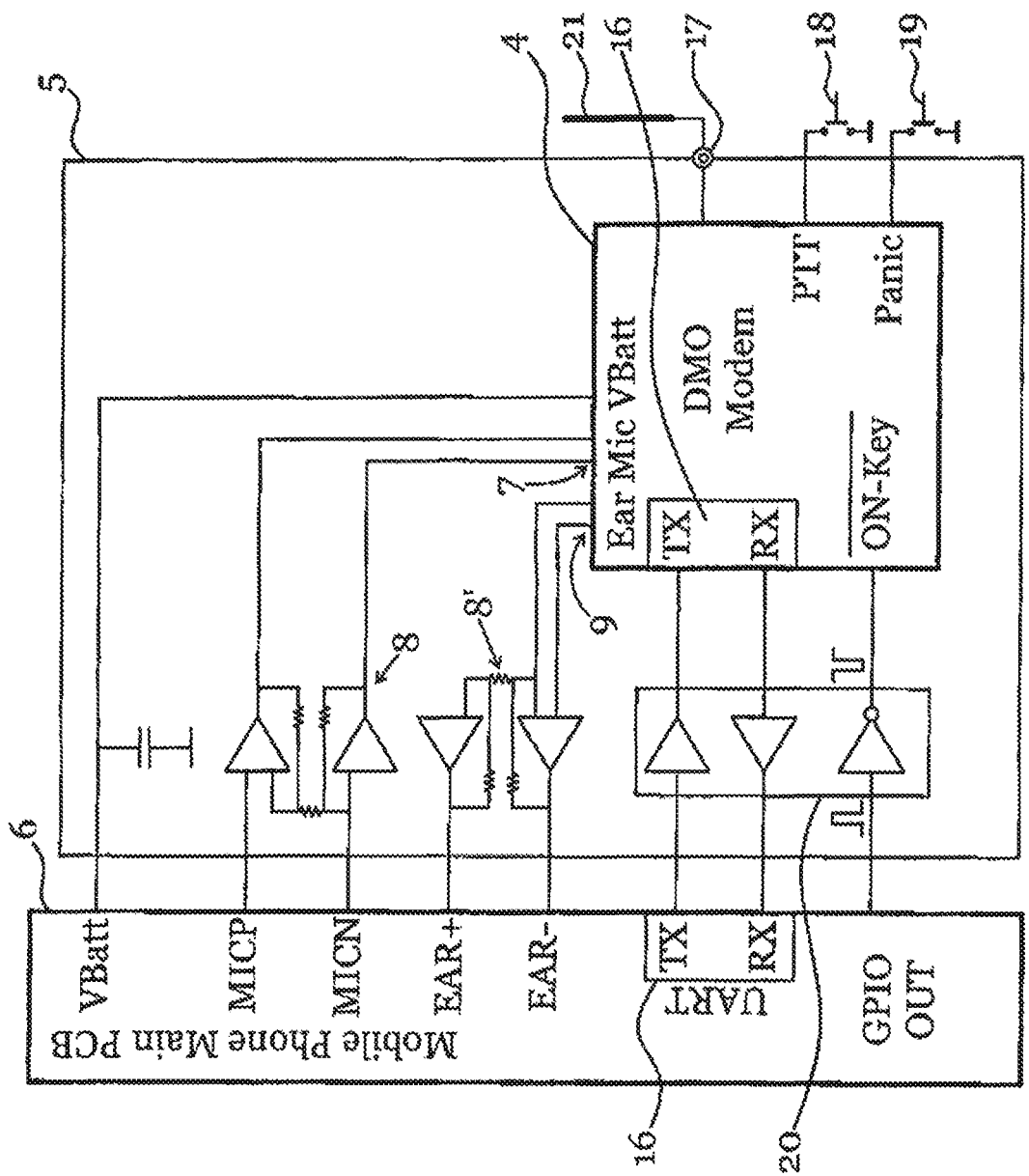
FIG. 5A shows an embodiment of the device according to the disclosure, wherein the hardware module 4 is connected via an interface 5 to the printed circuit board 6 of a mobile phone.

FIG. 5A shows an embodiment of the device according to the disclosure, wherein the hardware module 4 is connected via an interface 5 to the printed circuit board 6 of a mobile phone. Installation of the hardware module usually requires an increase in the thickness of the mobile phone of approximately 4 mm.

The hardware module 4 may be configured as a PCB in the form of a leadless chip carrier (LCC) with the dimensions 33 mm×33 mm×3.3 mm which is attached to the motherboard of the mobile phone.

In the exemplary embodiment according to FIG. 5A, the device is integrated into the mobile phone and uses its microphone and speaker to carry out direct communication.

For interaction with the speaker and microphone of the mobile phone, the hardware module 4 has a microphone interface 7 and a speaker interface 9. Via converter circuits 8, 8', these interfaces are connected to the corresponding inputs and outputs of the mobile phone printed circuit board 6.

The converter circuits 8, 8' are configured in such a manner that the intensity level of the GSM connection and the direct communication connection are adapted to one another in such a manner that, even when they are overlaid, both connections can be used. In this way, simultaneous connection via GSM and direct communication is facilitated.

The hardware module 6 in this exemplary embodiment does not have its own power supply, but is connected to the power supply of the mobile phone's printed circuit board 6. In order to transmit speech data, a UART interface 16 with a level adjustment 20 is provided, since the hardware module 4 uses a UART voltage of 2.85 V while a voltage value of 1.8 V is normally used for logic components on mobile phones.

Figure 5B:
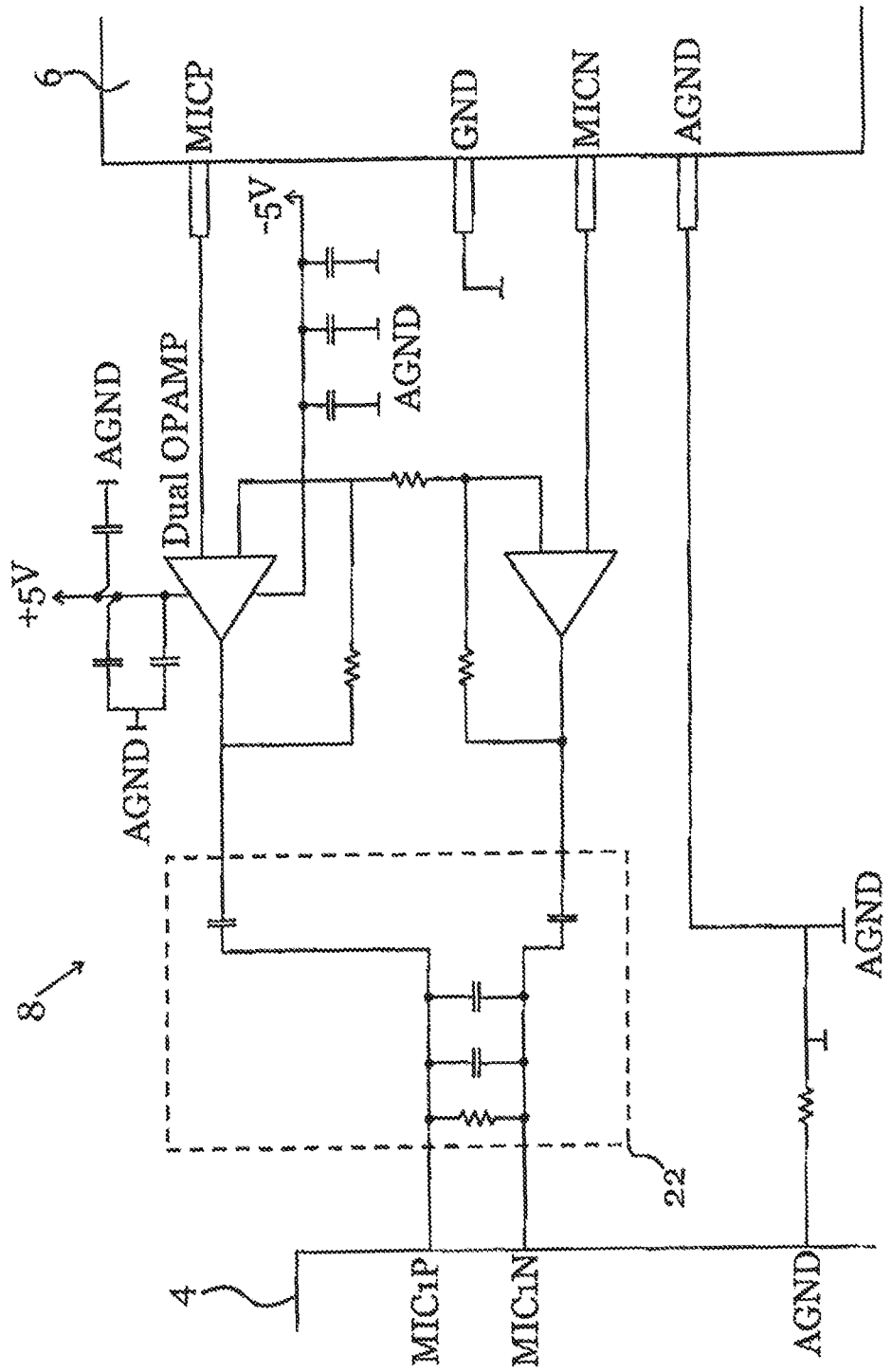
FIG. 5B shows a schematic depiction of an embodiment of the converter circuit 8 according to the disclosure for the conversion of microphone signals from the mobile phone's printed circuit board 6 and transmission to the hardware module 4, so that the microphone signals received by the mobile phone can be forwarded via the MICP and MICN connectors to the hardware module 4 using the MIC1P and MIC1N connectors and from there to the direct communication connection.

FIG. 5B shows a schematic depiction of an embodiment of the converter circuit 8 according to the disclosure for the conversion of microphone signals from the mobile phone's printed circuit board 6 and transmission to the hardware module 4, so that the microphone signals received by the mobile phone can be forwarded via the MICP and MICN connectors to the hardware module 4 using the MIC1P and MIC1N connectors and from there to the direct communication connection. In order to prevent the audio signals from being interfered with by the TDMA connection or noise from being recorded, it is necessary for all signal lines to be of the same length and preferably made between two earthed boards. In order to avoid interference, the signal path 22 should, in particular, be designed to be as close as possible to the hardware module 4.

Figure 5C:
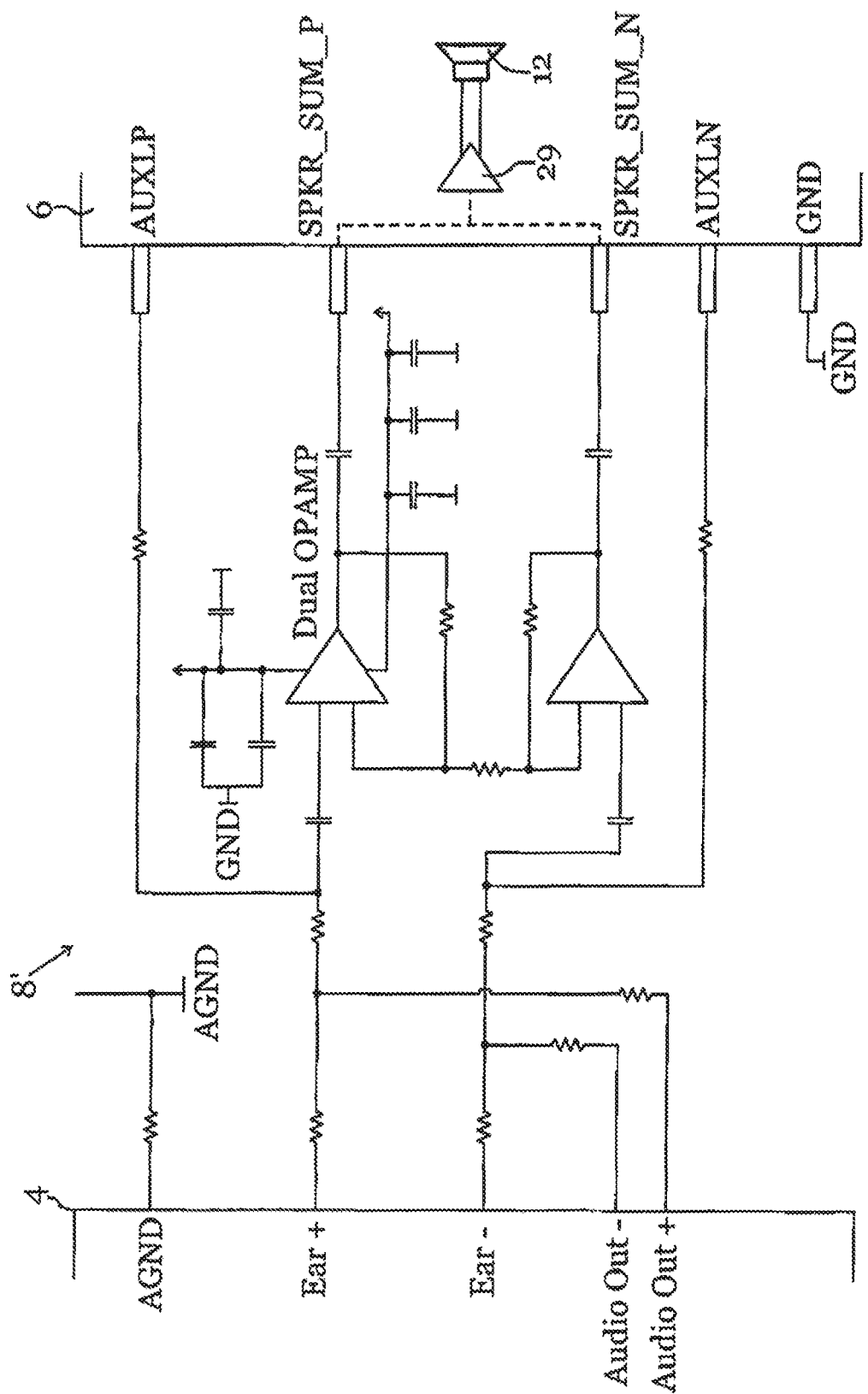
FIG. 5C shows a schematic representation of an embodiment of the converter circuit 8' according to the disclosure for conversion of the speaker signals of the hardware module 4 and transmission to the mobile phone printed circuit board 6, so that the audio signals entering by direct communication can be emitted at the mobile phone's speaker.

FIG. 5C shows a schematic representation of an embodiment of the converter circuit 8' according to the disclosure for conversion of the speaker signals of the hardware module 4 and transmission to the mobile phone printed circuit board 6, so that the audio signals entering by direct communication can be emitted at the mobile phone's speaker.

In the present exemplary embodiment, the hardware module 4 has speaker outputs AUDIOOUT+ and AUDIOOUT− and also headset outputs EAR+ and EAR− which are both conducted in the converter circuit 8'. In order to ensure that both the audio signals of the GSM connection and also the audio signals of the direct communication are emitted at the speaker 12 of the mobile phone, the audio output signal of the mobile phone is initially separated from the speaker amplifier 29 and conducted via the AUXLP and AUXLN connections shown into the converter circuit 8'. The speaker amplifier 29 is connected to the output connections of the converter circuit 8', SPKR_SUM_P and SPKR_SUM_N, so that the overlaying of the audio signals via AUXLP or AUXLN of the mobile phone, and also EAR+ or EAR− and AUDIOOUT+ or AUDIOOUT− of the hardware module 4, is emitted at the mobile phone speaker. Likewise, the converter circuit 8' must be carefully structured, in order to avoid interference due to the TDMA transmission or noise.

Figure 6A:
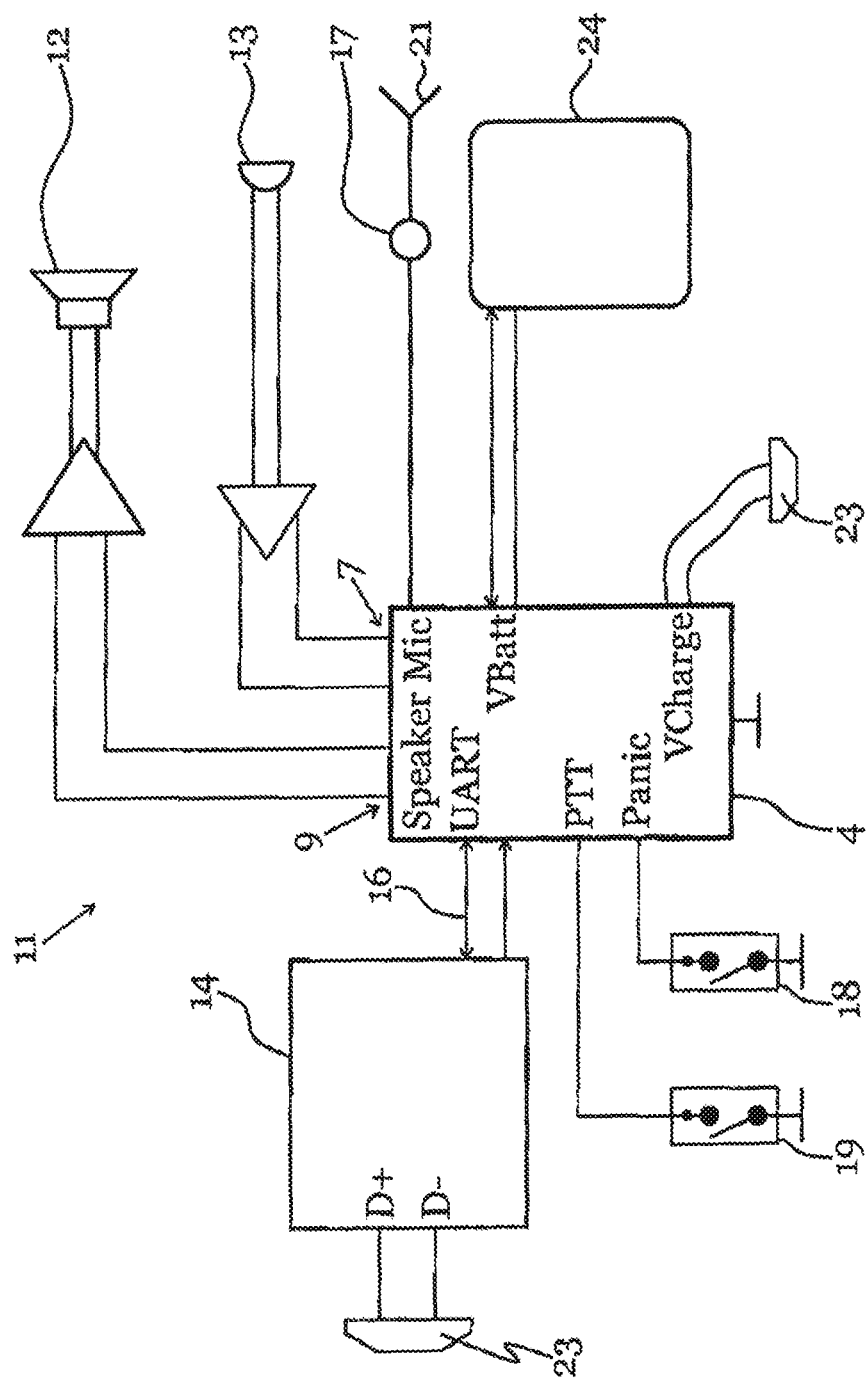
FIG. 6A shows an alternative embodiment of the device according to the disclosure as an external component 11 that can be connected to a mobile phone via a USB interface 23 with a separated speaker 12, a separate microphone 13 and a separate power supply in the form of a battery 24, wherein the hardware module 4 is integrated in the external component 11.

FIG. 6A shows an alternative embodiment of the device according to the disclosure as an external component 11 that can be connected to a mobile phone via a USB interface 23 with a separated speaker 12, a separate microphone 13 and a separate power supply in the form of a battery 24, wherein the hardware module 4 is integrated in the external component 11. The component 11 may, in particular, be configured as a remote speaker microphone which is connectable to the mobile phone via the USB interface 23.

In this exemplary embodiment, there is no mixing of the microphone and speaker signals of the GSM connection with the direct communication connection, so that the GSM connection must be conducted via the microphone and speaker of the mobile phone.

In this exemplary embodiment, a USB-UART converter 14 is arranged between the UART interface 16 of the hardware module 4 and the USB interface 23. Outputs of a speaker interface 9 lead from the hardware module 4 directly to a dedicated speaker 12 and from a microphone interface 7 directly to a dedicated microphone 13.

A converter circuit is not necessary in this case, as there is no mixing with the microphone and speaker signals of the GSM connection.

Furthermore, a separate antenna connection 17 and an external antenna 21 are provided. A further USB interface 23 is provided, via which the battery 24 can be charged. Furthermore, there is a dedicated push-to-talk button 18 and also an emergency button 19 on the component 11, which are connected to corresponding inputs on the hardware module 4. In order to connect the component 11 to the mobile phone, the component 11 must be configured as the USB slave and the mobile phone as the USB master.

Figure 6B:
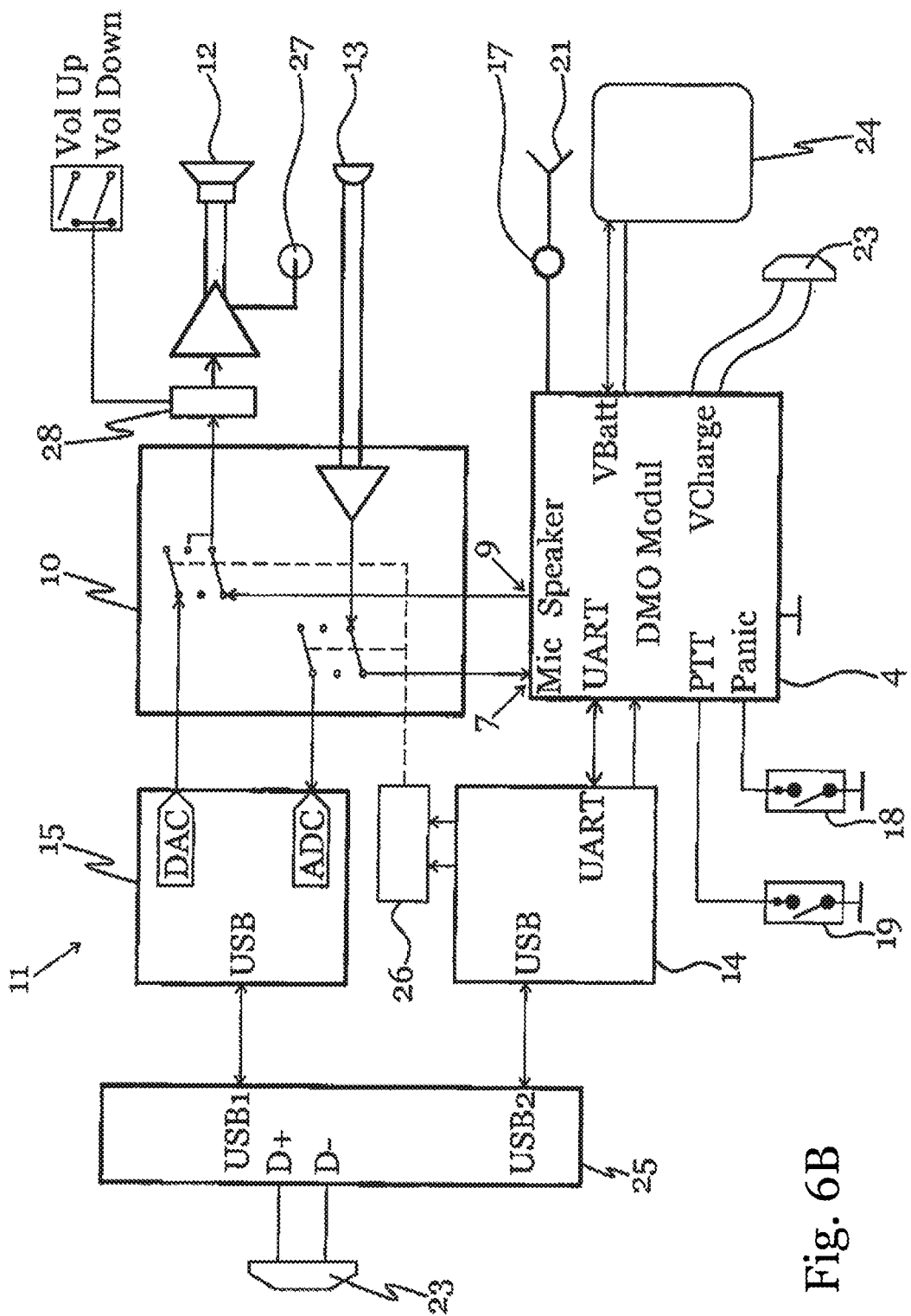
FIG. 6B shows a further embodiment of the device according to the disclosure as an external component 11 that can be connected to a mobile phone via a USB interface 23 with a separate speaker 12, a separate microphone 13 and a separate power supply in the form of a battery 24, wherein the hardware module 4 is integrated into the external component 11.

FIG. 6B shows a further embodiment of the device according to the disclosure as an external component 11 that can be connected to a mobile phone via a USB interface 23 with a separate speaker 12, a separate microphone 13 and a separate power supply in the form of a battery 24, wherein the hardware module 4 is integrated into the external component 11. The component 11 may in particular be configured as a remote speaker microphone which can be connected to the mobile phone via the USB interface 23. In this exemplary embodiment there is a mixing according to the disclosure of the microphone and speaker signals of the GSM connection with the direct communication connection via the multiplexer 10, so that apart from the direct communication connection, any GSM connection can also be made simultaneously via the microphone 13 and speaker 12 of the component 11.

Likewise, a USB-UART converter 14 is arranged between the UART interface 16 of the hardware module 4 and the USB interface 23. A USB hub 25 with a first USB interface USB1 and a second USB interface USB2 is arranged between the USB interface 23 and the USB-UART converter 14, so that a further USB interface is available for a USB Codec 15.

Via this USB Codec 15, the audio signals are transmitted from the mobile phone to the speaker 12 or from the microphone 13 to the mobile phone.

From the hardware module 4, outputs lead from a speaker interface 9 via a multiplexer 10 to a speaker 12 and from a microphone interface 7 likewise via the multiplexer 10 to a microphone 13. Via the multiplexer 10, which is controlled by a multiplexer control logic 26, the mixing according to the disclosure of the microphone and speaker signals of the direct communication connection with the microphone and speaker signals of the GSM connection takes place. To this end, the audio signals of the microphone 13 pass via the multiplexer 10 alternately via the microphone interface 7 to the hardware module 4, where they are transmitted in direct mode, and via the USB Codec 15 and the USB hub 25 to the mobile phone, where they are transmitted via a GSM connection. Likewise, the audio signals emitted by the speaker 12 come via the multiplexer 10 alternately from the GSM connection via USB Hub 25 and USB Codec 15, and also from the direct communication connection via the speaker interface 9. The USB interface USB2 at the USB hub is responsible for the transmission of the data packets to be sent in direct mode to transmitters and receivers in the mobile phone.

Furthermore, a separate antenna connection 17 and an external antenna 21 are provided. A further USB interface 23 is provided, via which the battery 24 can be charged. Furthermore, there is a dedicated push-to-talk button 18 on the component 11 and also an emergency call button 18 which are connected by corresponding inputs on the hardware module 4. In order to connect the component 11 to the mobile phone, the component 11 must be configured as the USB slave and the mobile phone as the USB master; this configuration is supported on Android mobile phones from version 4.5.

The disclosure is not limited to the present exemplary embodiments, but comprises all devices within the framework of the following patent claims. In particular, the disclosure is not limited to use with a mobile phone or smartphone, but comprises use in combination with any mobile devices which are suitable for the production of cellular mobile phone connections. Furthermore, the disclosure is also not limited to the use of GSM, but also comprises mobile phone communication via other cellular networks.

REFERENCE LIST

1 TDMA tframe
2 time slot
3 multi-frame
4 hardware module
5 interface
6 mobile phone printed circuit board
7 microphone interface
8, 8' converter circuit
9 speaker interface
10 multiplexer
11 separate component
12 speaker
13 microphone
14 USB-UART converter
15 USB Codec
16 UART interface
17 antenna connection
18 push-to-talk button
19 emergency call button
20 level adjustment
21 external antenna
22 signal path
23 USB interface
24 battery
25 USB hub
26 multiplexer control logic
27 external headset connection
28 volume control
29 speaker amplifier

The invention claimed is:

1. A device for direct communication between mobile devices using carrier frequencies of a cellular mobile phone system, wherein each carrier frequency transmits a TDMA frame with a TDMA frame duration of 4.615 milliseconds and each TDMA frame comprises 8 time slots, each time slot having a duration of 577 microseconds,
the device comprising circuitry which controls direct communication, wherein
the device is designed to combine TDMA frames into a multi-frame which comprises a plurality of successive TDMA frames and the device is configured to operate in a first communication mode in which, for at least one TDMA frame of the multi-frame, a defined set of time slots of the at least one TDMA frame is assigned for simplex communication, the defined set of time slots including a defined first time slot assigned for only transmitting or only receiving, and in which remaining time slots of the at least one TDMA frame are assigned for duplex communication,
wherein the defined set of time slots includes a plurality of defined second time slots, and the device is configured to receive a data packet in the defined first time slot, select a second time slot from the plurality of defined second time slots based on a number of times the data packet has been transmitted in simplex communication, and transmit the data packet in the selected second time slot.

2. The device according to claim 1, wherein the device is configured to perform cellular mobile communication and direct communication simultaneously and also configured to carry out cellular mobile communication or direct communication separately.

3. The device according to claim 1, wherein the circuitry is configured for integration into a mobile device.

4. The device according to claim 1, wherein the circuitry includes a microphone and a microphone interface for connecting to a mobile device, includes a speaker and a speaker interface for connecting to the mobile device, and includes a converter circuit for the mixing and/or level adjustment of audio signals.

5. The device according to claim 1, comprising:
a multiplexer, electrically coupled to the circuitry, for mixing audio signals of a direct communication connection with audio signals of a GSM connection.

6. The device according to claim 1, wherein the device is a separate component that includes an interface for selectively connecting to a corresponding interface of a mobile device, the device including a separate speaker and a separate microphone and a separate energy supply, wherein the circuitry is integrated into the separate component.

7. The device according to claim 6, wherein the separate component is configured as an external speaker microphone which is connectible via a USB interface to a mobile device.

8. The device according to claim 7, further including a USB-UART converter that activates the circuitry.

9. The device according to claim 6, wherein the separate component includes a multiplexer controlled by a USB Codec and controlled by a control logic for mixing audio signals in direct communication with audio signals of a GSM connection.

10. The device according to claim 1, wherein the circuitry comprises a serial interface configured as a UART interface, and an antenna connection.

11. The device according to claim 6, wherein the separate component includes one or more buttons connected to corresponding inputs of the circuitry.

12. The device according to claim 1, wherein the plurality of successive TDMA frames correspond to positions of the multi-frame, and the circuitry is configured in such a manner that at position 11 in the multi-frame an FCCH frequency correction burst is transmitted and at position 12 of the multi-frame an SCH synchronization burst is transmitted and in the remaining positions of the multi-frame TCH data bursts are transmitted.

13. A mobile device comprising or connected to the device according to claim 1.

* * * * *